US008853877B1

(12) United States Patent
Zalar et al.

(10) Patent No.: US 8,853,877 B1
(45) Date of Patent: Oct. 7, 2014

(54) SYSTEM AND METHOD FOR CONTROLLING A WIND FARM

(71) Applicant: General Electric Company, Schenectady, NY (US)

(72) Inventors: Jonathan Henry Zalar, Greer, SC (US); Thomas Frank Fric, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/904,333

(22) Filed: May 29, 2013

(51) Int. Cl.
*F03D 9/00* (2006.01)
(52) U.S. Cl.
USPC ............................................. 290/44; 700/287
(58) Field of Classification Search
USPC .................................. 290/43, 44, 55; 700/287
See application file for complete search history.

(56) References Cited

U.S. PATENT DOCUMENTS

| 7,071,579 | B2 * | 7/2006 | Erdman et al. | 290/55 |
| 7,298,059 | B2 * | 11/2007 | Delmerico et al. | 307/85 |
| 7,484,363 | B2 * | 2/2009 | Reidy et al. | 60/398 |
| 7,840,312 | B2 * | 11/2010 | Altemark et al. | 700/286 |
| 7,999,406 | B2 * | 8/2011 | Cardinal et al. | 290/44 |
| 8,283,803 | B2 * | 10/2012 | Fortmann et al. | 307/43 |
| 8,328,514 | B2 | 12/2012 | Viripullan et al. | |
| 8,718,832 | B2 * | 5/2014 | Hashimoto et al. | 700/287 |

* cited by examiner

*Primary Examiner* — Nicholas Ponomarenko
(74) *Attorney, Agent, or Firm* — Dority & Manning, P.A.

(57) ABSTRACT

A method for controlling a wind farm having a power output constraint is disclosed. The method may include operating a plurality of wind turbines within the wind farm. Each wind turbine may include a baseline power output and a maximum power output. The baseline power output may be defined by a control-limited power curve as a function of wind speed. In addition, the method may include comparing a total power output for the wind farm to the power output constraint of the wind farm, controlling the operation of at least one wind turbine of the plurality of wind turbines to provide an increased power output for the at least one wind turbine when the total power output is less than the power output constraint.

20 Claims, 8 Drawing Sheets

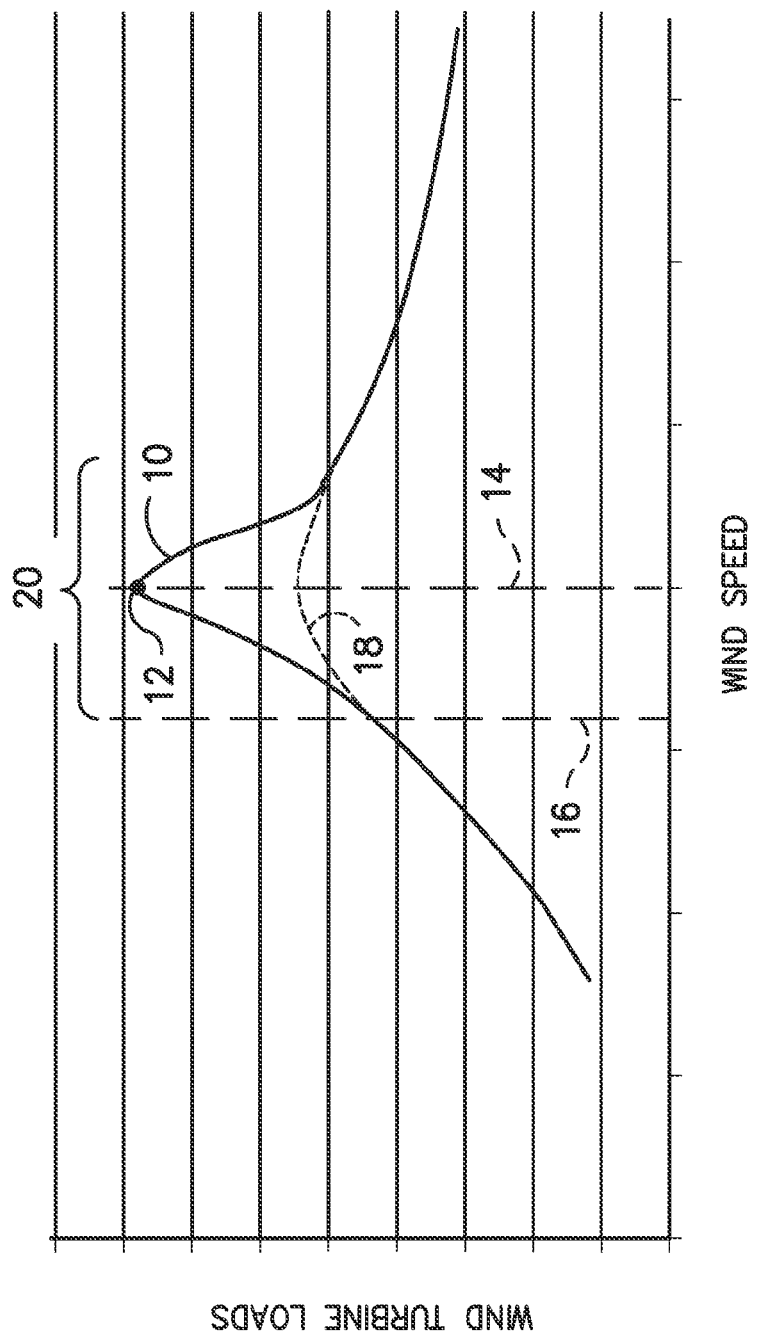
FIG. -1-
(PRIOR ART)

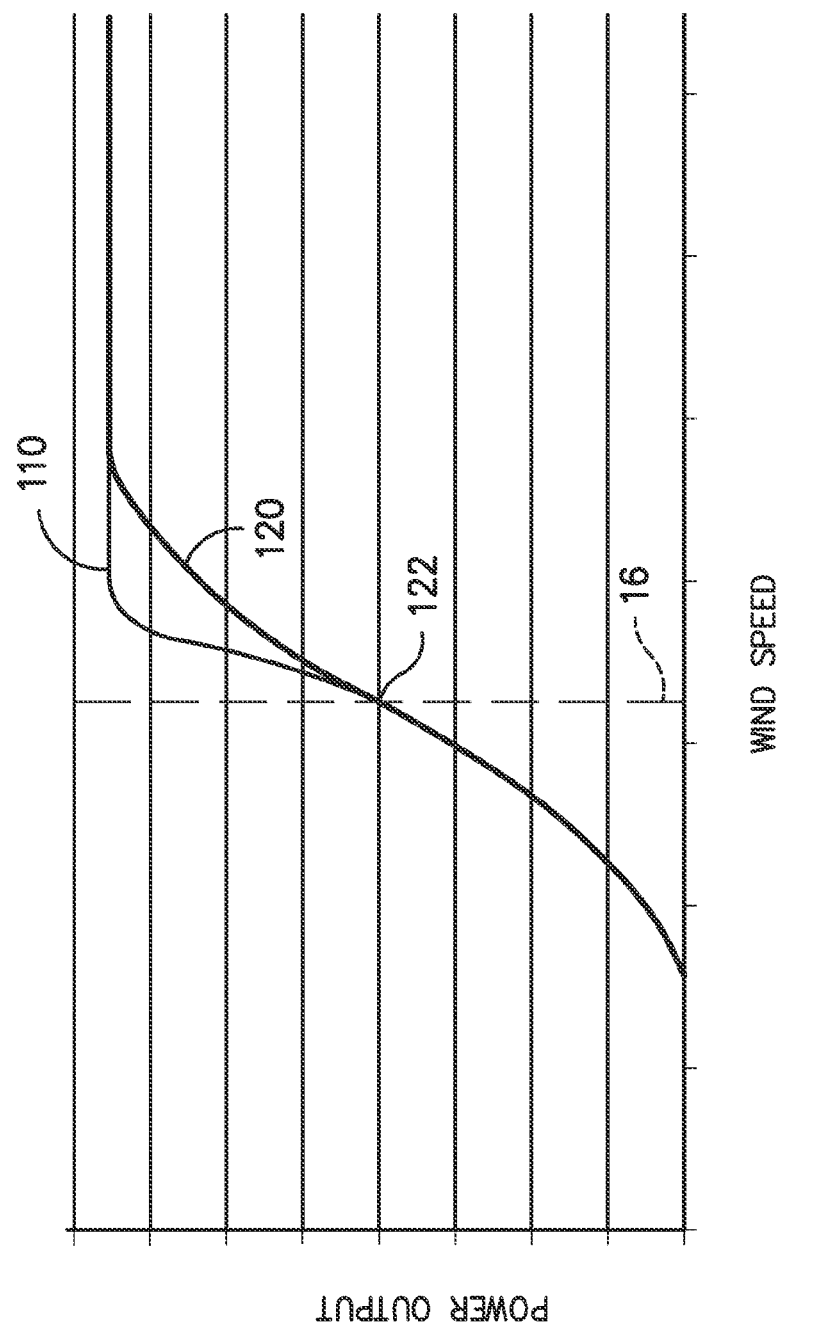
FIG. -2-
(PRIOR ART)

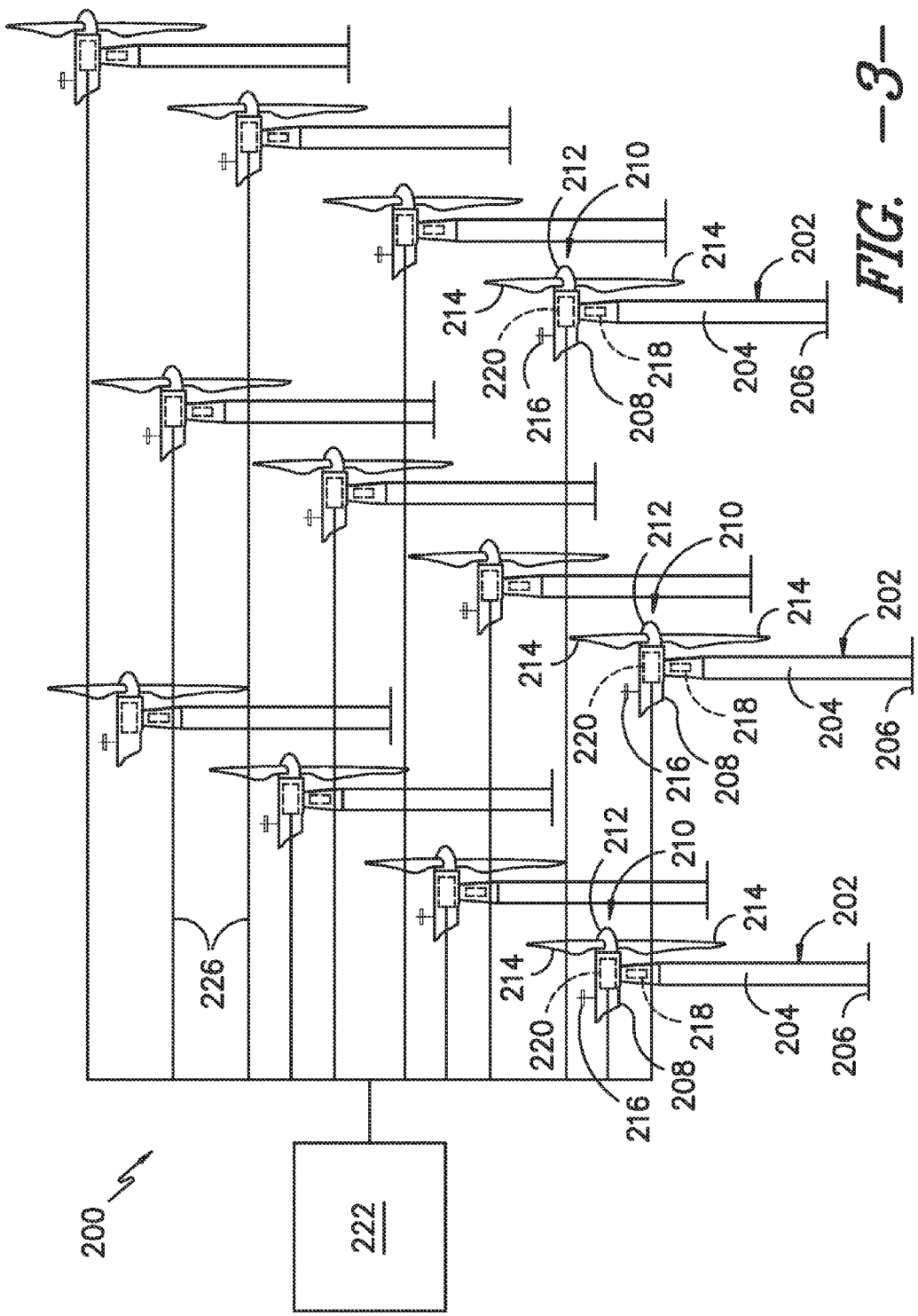
FIG. -3-

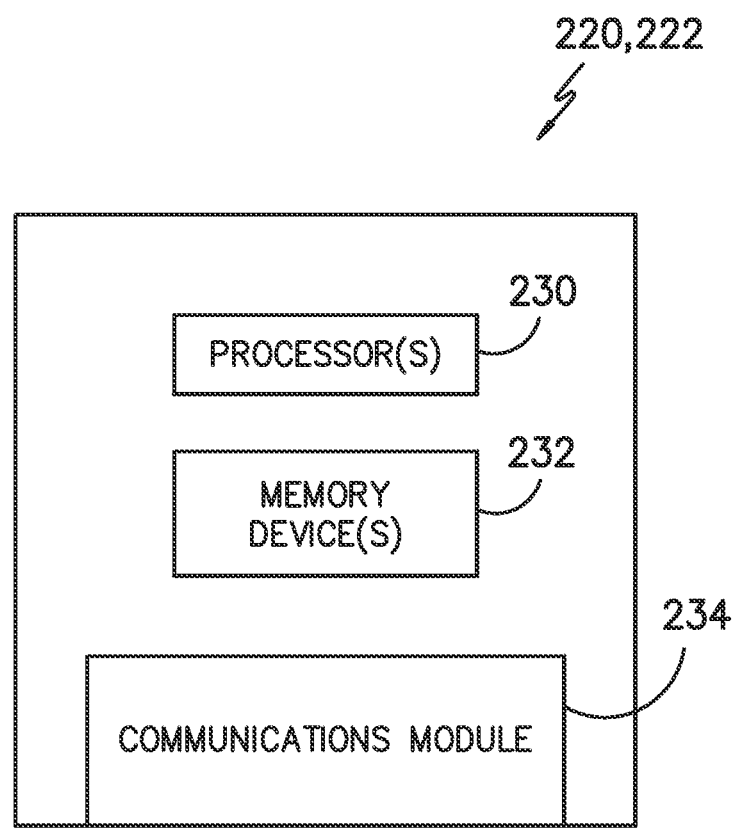
FIG. —4—

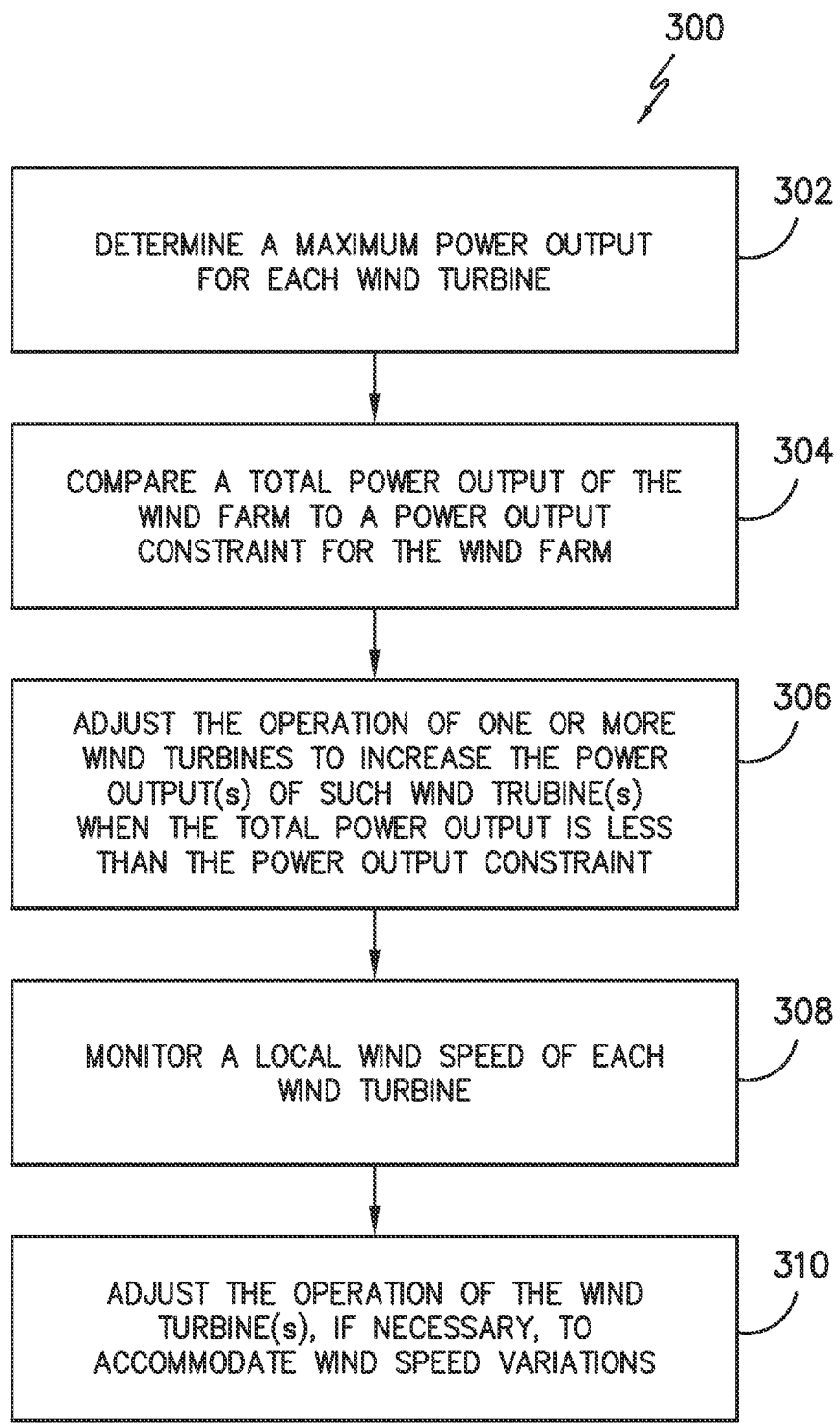
FIG. —5—

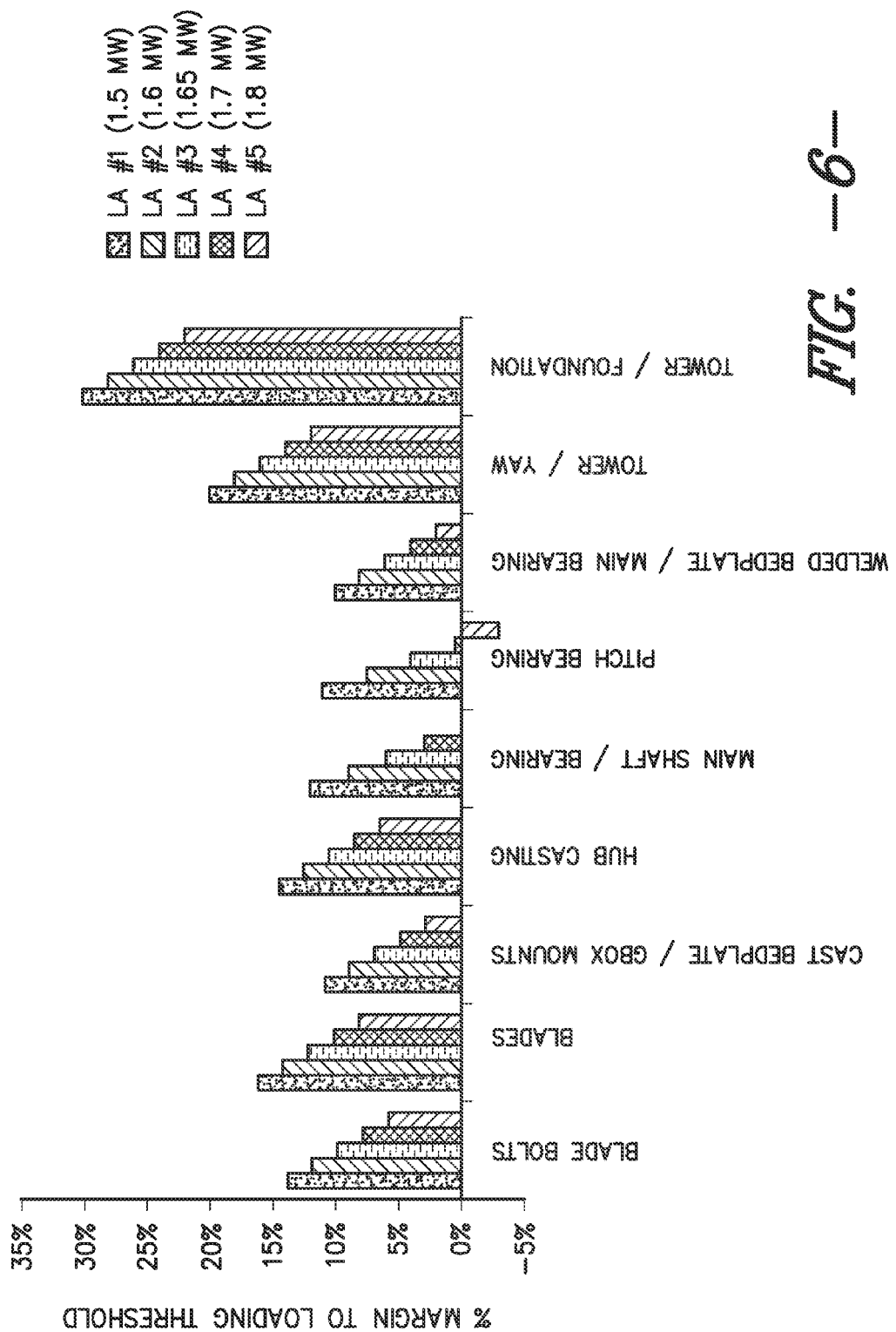

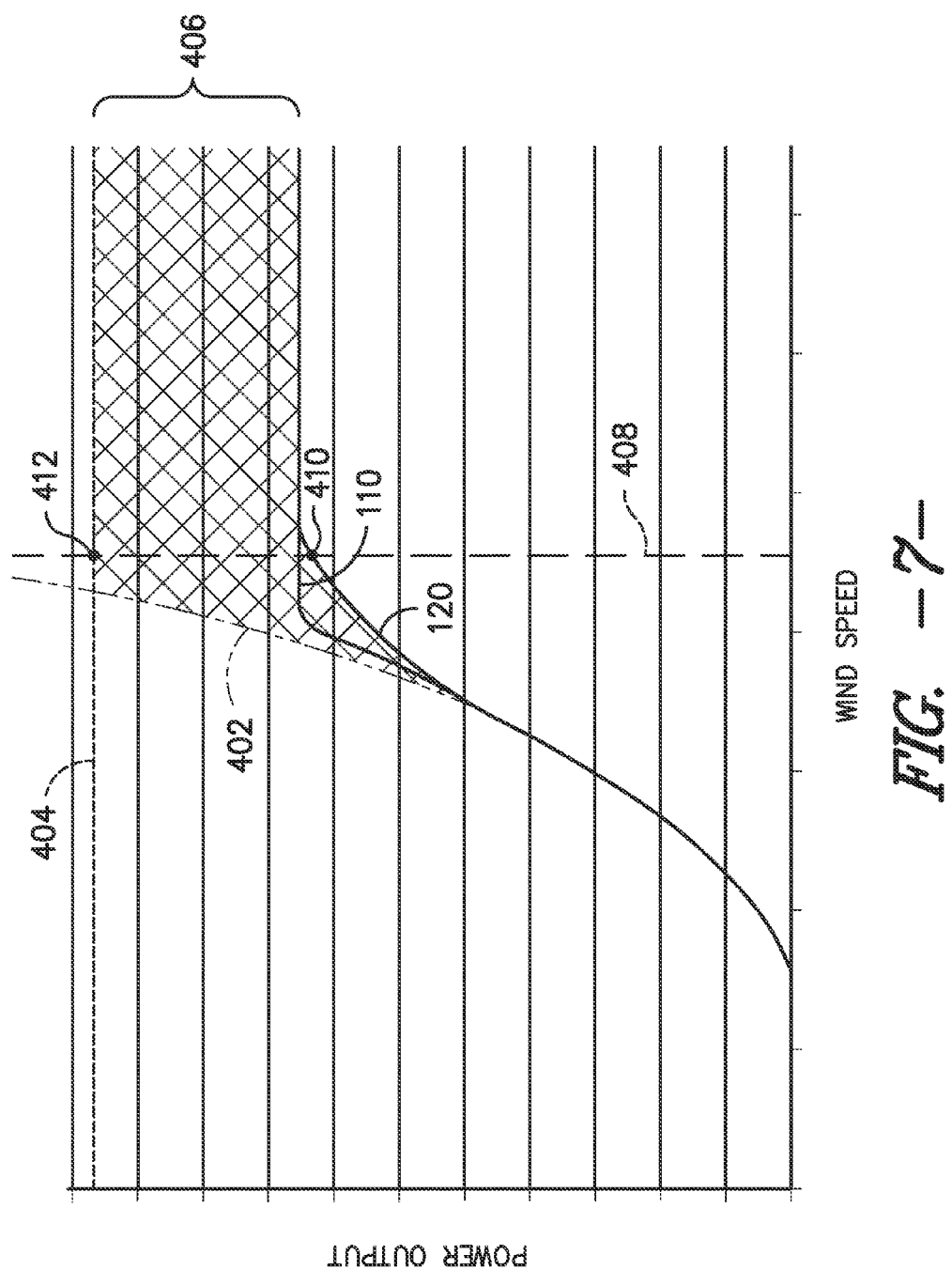
FIG. -7-

| | RATED POWER | RATED WIND SPEED | ACTUAL WIND SPEED | BASELINE POWER OUTPUT | MAXIMUM POWER OUTPUT |
|---|---|---|---|---|---|
| | POWER OUTPUT CONSTRAINT = 15MW | | | | |
| WT #1 | 1.5 MW | 13 m/s | 13 m/s | 1.5 MW | 1.7 MW |
| WT #2 | 1.5 MW | 13 m/s | 13 m/s | 1.5 MW | 1.7 MW |
| WT #3 | 1.5 MW | 13 m/s | 13 m/s | 1.5 MW | 1.8 MW |
| WT #4 | 1.5 MW | 13 m/s | 12 m/s | 1.35 MW | 1.8 MW |
| WT #5 | 1.5 MW | 13 m/s | 10 m/s | 1.25 MW | 1.8 MW |
| WT #6 | 1.5 MW | 13 m/s | 12 m/s | 1.35 MW | 1.8 MW |
| WT #7 | 1.5 MW | 13 m/s | 9 m/s | 1.1 MW | 1.85 MW |
| WT #8 | 1.5 MW | 13 m/s | 9 m/s | 1.1 MW | 1.85 MW |
| WT #9 | 1.5 MW | 13 m/s | 8 m/s | 1.0 MW | 1.9 MW |
| WT #10 | 1.5 MW | 13 m/s | 13 m/s | 1.5 MW | 1.8 MW |
| | | | TOTAL POWER OUTPUT | 13.15 MW | |

FIG. —8—

SYSTEM AND METHOD FOR CONTROLLING A WIND FARM

FIELD OF THE INVENTION

The present subject matter relates generally to wind turbines and, more particularly, to a system and method for controlling a wind farm in a manner that enhances its power output capabilities.

BACKGROUND OF THE INVENTION

Wind power is considered one of the cleanest, most environmentally friendly energy sources presently available and wind turbines have gained increased attention in this regard. A modern wind turbine typically includes a tower, generator, gearbox, nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is geared to a generator for producing electricity.

At wind speeds well below the rated wind speed of a wind turbine, the pitch angle of the rotor blades is typically maintained at the power position in order to capture the maximum amount of energy from the wind. However, as wind speeds reach and exceed the rated wind speed, the pitch angle is adjusted towards feather to maintain the power output of the wind turbine at its rated power. As a result, the power output of the wind turbine is constrained at wind speeds above the rated wind speed. In addition, the aerodynamic loads acting on the rotor blades continually increase with increasing wind speeds while the pitch angle of the rotor blades is maintained at the power position and then begin to decrease as the pitch angle is adjusted towards feather with wind speeds above the rated wind speed. Such control of the wind turbine typically creates a peak in the aerodynamic loading on a wind turbine at its rated wind speed. For example, FIG. 1 illustrates a graph of wind speed (x-axis) versus loads (y-axis) for a typical wind turbine. As shown, aerodynamic loads on the wind turbine increase along loading line 10 to a peak 12 at the rated wind speed (indicated by line 14) and then decrease as the rotor blades are pitched toward feather in order to maintain the wind turbine at its rated power.

To prevent the formation of such a peak 10, peak-shaving control methods are known that are used to reduce the loads on a wind turbine at or near the rated wind speed. In particular, these control methods typically begin to adjust the pitch angle of the rotor blades at some point prior to the rated wind speed. For example, as shown in FIG. 1, by adjusting the pitch angle of the rotor blades towards feather prior to reaching the rated wind speed (e.g., at a given wind speed threshold indicated by line 16), the loads acting on the rotor blade at or near the rated wind speed may be reduced along loading curve 18. Specifically, as shown in FIG. 1, the use of a peak shaving control method may create a peak shaving range 20 at which loads are reduced along a range of wind speed values.

However, such a control method also results in a reduction in the overall efficiency of the wind turbine, as power production at or near the rated wind speed is sacrificed (i.e., by prematurely pitching the rotor blades) in order to reduce blade loading. For example, FIG. 2 illustrates a graph of wind speed (x-axis) versus power (y-axis) for wind turbines implementing the control methodologies described above with reference to FIG. 1. Specifically, power curve 110 defines the baseline power output for a wind turbine using a control methodology in which the rotor blades are pitched towards feather at or near the rated wind speed (i.e., the power output corresponding to the loading curve 10 of FIG. 1) and power curve 120 defines the baseline power output for a wind turbine using a peak-shaving control method (i.e., the power output corresponding to the loading curve 20 of FIG. 1). As shown, due to the peak-shaving control methodology, the power curve 120 transitions from a positive curvature to a negative curvature at an inflection point 122 defined at the wind speed threshold 16 (i.e., the point at which the pitch angle adjustment is initiated), thereby indicating that the power production has been curtailed at wind speeds above this threshold 16.

Typically, the average wind turbine site experiences wind speeds below the rated wind speed for the majority of the operating life of the wind turbine(s) located at such site. For example, in some instances, a wind turbine site may experience wind speeds at or above the rated wind speed only 6% of the time. As such, the reduction in power output resulting from the use of peak-shaving control methods at wind speeds at and below the rated wind speed can be quite significant, particularly for a wind turbine site including a large number of wind turbines. Moreover, conventional control methodologies that maintain the power output of a wind turbine as its rated power at increased wind speeds may significantly limit the control options for controlling an output-constrained wind farm.

Accordingly, a system and method for controlling the wind turbines of a wind farm that allows for the total power production of the farm to be increased across a wide range of wind speeds would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a wind farm having a power output constraint. The method may include operating a plurality of wind turbines within the wind farm. Each wind turbine may include a baseline power output and a maximum power output. The baseline power output may be defined by a control-limited power curve as a function of wind speed. In addition, the method may include comparing a total power output for the wind farm to the power output constraint of the wind farm, controlling the operation of at least one wind turbine to provide an increased power output for the at least one wind turbine when the total power output is less than the power output constraint. The increased power output at a current wind speed of the at least one wind turbine may be less than or equal to the maximum power output for the at least one wind turbine and greater than the baseline power output associated with the at least one wind turbine at the current wind speed.

In another aspect, the present subject matter is directed to a system for controlling a wind farm having a power output constraint. The system may include a plurality of wind turbines. Each wind turbine may include a baseline power output and a maximum power output. The baseline power output may be defined by a control-limited power curve as a function of wind speed. The system may also include a plurality of wind sensors. Each wind sensor may be configured to monitor a current wind speed of one of the plurality of wind turbines.

In addition, the system may include a controller communicatively coupled to the wind turbines and the wind sensors. The controller may be configured to compare a total power output of the wind farm to the power output constraint for the wind farm. The controller may also be configured to control the operation of at least one wind turbine to provide an increased power output for the at least one wind turbine when the total power output is less than the power output constraint. The increased power output at the current wind speed of the at least one wind turbine may be less than or equal to the maximum power output for the at least one wind turbine and may be greater than the baseline power output associated with the at least one wind turbine at the current wind speed.

In a further aspect, the present subject matter is directed to a method for controlling a wind turbine. The method may include performing a loading analysis on the wind turbine to determine a maximum power output for the wind turbine. The wind turbine may include a baseline power output defined by a control-limited power curve as a function of wind speed. In addition, the method may include monitoring a current wind speed of the wind turbine and controlling the operation of the wind turbine at the current wind speed to provide an adjusted power output that is less than or equal to the maximum power output and greater than the baseline power output associated with the current wind speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an example graph of wind speed (x-axis) versus loads (y-axis) for a typical wind turbine;

FIG. 2 illustrates an example graph of wind speed (x-axis) versus power (y-axis) for the wind turbine associated with FIG. 1, particularly illustrating the curtailed power output of the wind turbine resulting from the use of conventional control methodologies;

FIG. 3 illustrates a simplified, schematic view of one embodiment of a wind farm in accordance with aspects of the present subject matter;

FIG. 4 illustrates a schematic view of one embodiment of suitable components that may be included within a turbine controller of each wind turbine and/or a farm controller of the wind farm in accordance with aspects of the present subject matter;

FIG. 5 illustrates a flow diagram of one embodiment of a method for controlling a wind farm in accordance with aspects of the present subject matter;

FIG. 6 illustrates a graph showing example results of various loading analyses (e.g., LA#1-#5) performed on a wind turbine in order to determine its loading-based maximum power output in accordance with aspects of the present subject matter;

FIG. 7 illustrates an example graph of wind speed (x-axis) versus power (y-axis) for a wind turbine implementing the method disclosed herein, particularly illustrating the power output range along which the power output of the wind turbine may be varied between its baseline and maximum power outputs; and FIG. 8 illustrates an example data table for a wind turbine farm, particularly illustrating the difference between the actual power outputs and the maximum power outputs for the wind turbines of such farm.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a wind farm. Specifically, the disclosed system and method provide a means for increasing the total power output of a wind farm when one or more of the wind turbines within such farm are operating at wind speeds below their rated wind speed and, thus, are not producing at their rated power. For example, in several embodiments, a loading analysis may be performed on each wind turbine to determine the maximum power output that can be achieved by each wind turbine without damaging the turbine's components. As will be described below, most wind turbines have a significant load margin at their rated power output and, thus, the maximum power output for a wind turbine may be substantially higher than its rated power output. Accordingly, by controlling the operation of the wind turbines within a wind farm such that the power output of each wind turbine does not exceed its maximum power output, the total power output of the wind farm may be significantly increased.

In several embodiments, the present subject matter will be described with reference to wind farms having power output constraints. As is generally understood, a wind farm may be subject to a power output constraint corresponding to the maximum power output that may be transmitted from the farm to the grid. Thus, the sum of the power generated by each wind turbine within the wind farm must be equal to or less than the power output constraint. To ensure that this power output constraint is not exceeded, the number of wind turbines installed at an output-constrained farm is typically selected such that the total power output of the wind farm is equal to the power output constraint when all the wind turbines are operating at their rated power. For instance, for a wind farm having a power output constraint of 150 megawatts (MW), 100 wind turbines having a rated power of 1.5 MW would typically be installed on the farm. However, as indicated above, wind turbines typically operate at wind speeds below their rated wind speed. As a result, due to the use of conventional control methodologies (e.g., peak-shaving control methodologies), the resulting power output of the wind farm is often significantly less than the power output constraint. As will be described below, by reducing and/or eliminating the operational constraints provided by such conventional control methodologies and by controlling each wind turbine based on its maximum power output, the wind turbines within a wind farm may be operated in a manner that allows the total power output of the farm to be equal or substantially equal to the power output constraint, thereby enhancing the farm's efficiency.

However, it should be appreciated that the present subject matter need not be limited to wind farms having a power output constraint. For example, the disclosed system and method may be utilized to individually control each wind turbine within a wind farm without reference to the farm's total power output. Specifically, by determining the maximum power output for a given wind turbine, the wind turbine may be controlled in a manner that allows its power output to be maximized. For example, instead of curtailing the power output of a wind turbine as the turbine approaches its rated wind speed and then maintaining the power output at its rated power for speeds above the rated wind speed (e.g., as shown in FIG. 2), the wind turbine may be allowed to achieve higher power outputs at lower wind speeds (including power outputs that exceed the rated wind speed), with the only limiting constraint being the maximum power output determined for the wind turbine.

It should also be appreciated that, for purposes of describing the present subject matter, it may be assumed that each wind turbine has a baseline power output defined by a control-limited power curve. As used herein, the term "control-limited power curve" refers generally to a power curve along which a wind turbine's power output is constrained or limited across one or more wind speed ranges. Thus, a control-limited power curve may be, for example, the power curves shown in FIG. 1. For example, by pitching the rotor blades at wind speeds at and above the rated wind speed in order to maintain a constant power output, the baseline power output defined by the power curve 110 is significantly limited at wind speeds at and above the rated wind speed. Similarly, by pitching the rotor blades at wind speeds below the rated wind speed to reduce blade loading and by further pitching the rotor blades at wind speeds above the rated wind speed to maintain a constant power output, the baseline power output defined by the power curve 116 is significantly limited across a wide range of wind speeds both below and above the rated wind speed. In other embodiments, control-limited power curves may correspond to the power curves resulting from any other suitable control methodologies that limit a wind turbine's power output at wind speeds below and/or above its rated wind speed.

Referring now to FIG. 3, a schematic view of one embodiment of a wind farm 200 is illustrated in accordance with aspects of the present subject matter. In general, the wind farm 200 may include a plurality of wind turbines 202. For example, as shown in the illustrated embodiment, the wind farm 200 includes twelve wind turbines 202. However, in other embodiments, the wind farm 200 may include any other number of wind turbines 202, such as less than twelve wind turbines 202 or greater than twelve wind turbines 202.

As shown in FIG. 3, each wind turbine 202 includes a tower 204 extending from a support surface 206, a nacelle 208 mounted on the tower 204, and a rotor 210 coupled to the nacelle 208. The rotor 210 includes a rotatable hub 212 and at least one rotor blade 214 coupled to and extending outwardly from the hub 212. For example, in the illustrated embodiment, the rotor 210 includes three rotor blades 214. However, in alternative embodiments, the rotor 210 may include more or less than three rotor blades 214. Each rotor blade 214 may be spaced about the hub 212 to facilitate rotating the rotor 210 to enable kinetic energy to be transferred from the wind into usable mechanical energy, and subsequently, electrical energy. For instance, the hub 212 of each wind turbine 202 may be rotatably coupled to an electric generator (not shown) positioned within the nacelle 208 to permit electrical energy to be produced.

Additionally, in several embodiments, each wind turbine 202 may include one or more sensors for monitoring various operating parameters/conditions of the wind turbines 202. For example, in one embodiment, each wind turbine may include a wind sensor 216, such as an anemometer or any other suitable device, configured for measuring wind speeds. As is generally understood, wind speeds may vary significantly across a wind farm 200. Thus, the wind sensors 202 may allow for the local wind speed at each wind turbine 202 to be monitored. In addition, each wind turbine 202 may also include a power output sensor 218. For instance, the power output sensors 218 may comprise sensors configured to monitor electrical properties of the output of the generator of each wind turbine 202, such as current sensors, voltage sensors or power monitors that monitor power output directly based on current and voltage measurements. Alternatively, the power output sensors 218 may comprise any other sensors that may be utilized to monitor the power output of a wind turbine 202.

Moreover, each wind turbine 202 may include a turbine control system or turbine controller 220 centralized within its nacelle 208. In general, the turbine controller 220 may comprise a computer or other suitable processing unit. Thus, in several embodiments, the turbine controller 220 may include suitable computer-readable instructions that, when implemented, configure the controller 220 to perform various different functions, such as receiving, transmitting and/or executing wind turbine control signals. As such, the turbine controller 220 may generally be configured to control the various operating modes (e.g., start-up or shut-down sequences) and/or components of the wind turbine 202. For example, the controller 220 may be configured to control the blade pitch or pitch angle of each of the rotor blades 214 (i.e., an angle that determines a perspective of the rotor blades 214 with respect to the direction of the wind) to control the power output generated by the wind turbine 202 by adjusting an angular position of at least one rotor blade 241 relative to the wind. For instance, the turbine controller 220 may control the pitch angle of the rotor blades 214, either individually or simultaneously, by transmitting suitable control signals to a pitch drive or pitch adjustment mechanism (not shown) of the wind turbine 202.

Moreover, as shown in FIG. 3, the turbine controller 220 of each wind turbine 202 may be communicatively coupled to a farm controller 222. For instance, in one embodiment, each turbine controller 220 may be communicatively coupled to the farm controller 222 through a wired connection, such as by connecting the controllers 220, 222 through suitable communicative links 226 (e.g., a suitable cable). Alternatively, each turbine controller 220 may be communicatively coupled to the farm controller 222 through a wireless connection, such as by using any suitable wireless communications protocol known in the art.

Similar to each turbine controller 220, the farm controller 222 may generally comprise a computer or other suitable processing unit. Thus, in several embodiments, the farm controller 222 may include suitable computer-readable instructions that, when implemented, configure the controller 22 perform various different functions, such as issuing and/or transmitting wind turbine control signals to each turbine controller 220. As such, the farm controller 222 may generally be configured to control any or all of the turbine controllers 220 in the wind farm 220 in order to change or alter the operating mode of any number of the wind turbines 202. Specifically, the farm controller 222 may be configured to command a single wind turbine 202, particular groups of wind turbines 202 or all of the wind turbines 202 in the wind farm 200 to enter into a particular operating mode and/or to perform a particular action in order to adapt the wind turbine(s) 202 to changing operating conditions. For instance, as will be described below, the farm controller 222 may be configured to regulate the operational setpoints (e.g., speed and/or torque setpoints) of one or more of the wind turbines 202 within the wind farm 200 such that the total power output of the farm is enhanced.

Referring now to FIG. 4, a block diagram of one embodiment of suitable components that may be included within each turbine controller 220 and/or the farm controller 222 is illustrated in accordance with aspects of the present subject matter. As shown, each turbine controller 220 and/or the farm controller 222 may include one or more processor(s) 230 and associated memory device(s) 232 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 232 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 232 may generally be configured to store suitable computer-readable instructions that, when implemented by the processor(s) 230, configure each turbine controller 220 and/or the farm controller 222 to perform various functions including, but not limited to, determining the power output of each wind turbine 202, comparing the total power output of the wind farm 200 to its corresponding power output constraint, adjusting the operation of one or more of the wind turbines 202 in order to adjust the total power output of the wind farm and/or the like.

Additionally, each turbine controller 220 and/or farm controller 222 may also include a communications module 234 to facilitate communications between the controller(s) 220, 222 and the various components of each wind turbine 202 and/or to facilitate communications between each controller 220, 222. For instance, the communications module 234 may include a sensor interface (e.g., one or more analog-to-digital converters) to permit the signals transmitted by the sensor(s) 216, 218 to be converted into signals that can be understood and processed by the processors 230.

Referring now to FIG. 5, a flow diagram of one embodiment of a method 200 for controlling a wind farm is illustrated in accordance with aspects of the present subject matter. In general, the method 300 will be described herein with reference to an output-constrained wind farm 200. However, as will be described below, aspects of the present subject matter may also be utilized to operate a non-constrained wind farm 200 and/or to operate individual wind turbines 202 in order to maximize the power output of such farm and/or turbine(s).

As shown in FIG. 5, at 302, a maximum power output for each wind turbine 202 may be determined. Specifically, in several embodiments, a loading analysis may be performed on each wind turbine 202 to determine its maximum power output based on the load margins for the turbine's components. For example, when operating at its rated power, a substantial load margin may exist between the actual loading on the wind turbine's components and the design envelope or loading threshold for each component (i.e., the point at which a given component will actually fail due to excessive loading). Thus, by analyzing the load margins for a given wind turbine 202, the load-based maximum power output for the wind turbine 202 may be determined. This maximum power output may then be stored within the turbine's controller 220 and/or the farm controller 222 and subsequently utilized to control the operation of the wind turbine 202.

In several embodiments, the loading analysis may be performed using a computer-generated model. For example, a three-dimensional model (e.g., a finite element model) of each wind turbine 202 may be created using suitable modeling software. In doing so, the various design and/or mechanical parameters for each wind turbine component (e.g., geometry/shape, dimensions and material properties, such as poison's ratio, Young's modulus and density, etc.) may be input into the model. Thereafter, using suitable load analysis software (e.g., any suitable commercially available finite element analysis software), the operation of the wind turbine 202 may be modeled based on the turbine's known and/or expected operating conditions.

For instance, in several embodiments, site-specific wind conditions, such as an average wind speed at the site (e.g., an annual average wind speed or a twenty year average wind speed), an average wind speed distribution at the site (i.e., the distribution or profile of the wind speed over an extended period of time) and/or any other suitable site-specific operating condition(s) (e.g., wind gusts and/or turbulence intensity at the site), may be used as loading inputs to accurately model the operation of each wind turbine 202 based on its known and/or expected operating conditions. The resulting components loads may then be analyzed based on the loading threshold for each wind turbine component to identify the maximum rotor speed and torque setting that the wind turbine 202 may be operated without a component failure, which may then be used to determine the maximum power output of the wind turbine 202.

For instance, FIG. 6 illustrates an example data chart showing the results of various loading analyses (e.g., LA #1-#5) performed on a 1.5 MW wind turbine, with several of the wind turbine components being charted along the x-axis and the % margin to loading threshold being charted along the y-axis. As shown, at the rated power of 1.5 MW, the loading analysis indicated that a substantial load margin existed for each of the wind turbine components. However, as the rotor speed and/or torque settings of the wind turbine 202 were increased to allow for increased power outputs, the component loads also increased, thereby reducing the load margins for each component. For instance, as shown in FIG. 6, when operating at a power output of 1.8 MW, the load margin for the pitch bearing transitions from positive to negative, thereby indicating a high likelihood that the pitch bearing would fail due to excessive loading. Thus, it was determined that, based on the known and/or expected operating condition of the particular wind turbine being analyzed, the maximum power output for such wind turbine should be set at below 1.8 MW, such as at 1.7 MW or 1.75 MW.

It should be appreciated that, although each wind turbine 202 installed within a wind farm 202 may have the exact same design specifications, the maximum power output for each wind turbine 202 may vary due to varying operating conditions. For example, wind turbines 202 located on the left side of a field may be subjected to lower average wind speeds and/or lower wind distributions than wind turbines 202 located on the right side of the field (e.g., due to terrain differences, such as hills, etc.). As a result, the loading analysis may indicate that the wind turbines 202 on the left side of the field have a higher maximum power output than the wind turbines 202 on the right side of the field due to the lower loads acting on such wind turbines 202. Similarly, wind turbines 202 located downstream of other wind turbines 202 may be subject to vastly different operating conditions than the upstream wind turbines 202 and, thus, the maximum power outputs may differ between the upstream and downstream wind turbines 202.

Referring back to FIG. 5, during operation of the wind farm 202, at 304, the total power output of the wind farm 202 may be continuously monitored and compared to the power output constraint for the farm 202. For example, as indicated above, each wind turbine 202 may include a power output sensor 218 configured to monitor its power output. In such an embodiment, the power output measurements provided by the sensors 218 may be summed to determine the total power output of the wind farm 202. Alternatively, the total power output may be determined by measuring the power output at a point of common coupling for the wind farm 202 (e.g., at or downstream of the main power transformer (now shown) for the wind farm 200).

If the total power output is equal to the power output constraint, the operation of the wind turbines 202 may be continued without modification. However, at 306, if the total power output is less than the power output constraint, the operation of one or more of the wind turbines 202 may be modified so as to increase the power output of such wind turbine(s) 202 and, thus, reduce the deficiency between the total power output and the power output constraint. For example, in several embodiments, the rotor speed and/or torque setpoints of the wind turbine(s) 202 may be adjusted to increase the power output(s) such that that the total power output of the wind farm 200 is equal or substantially equal to the power output constraint, thereby enhancing the farm's efficiency. It should be appreciated that, as used herein, the total power output of the wind farm 200 is substantially equal to the power output constraint when the total power output is within 10% of the power output constraint, such as within 5% of the power output constraint or within 2.5% of the power output constraint.

As indicated above, due to the existence of load margins for the wind turbine(s) 202, the power output(s) of the wind turbine(s) 202 may be adjusted significantly in order to maximize the total power output of the wind farm 200. For example, FIG. 7 illustrates a graph of wind speed (x-axis) versus power (y-axis) for wind turbines 202 implementing various control methodologies. Specifically, power curves 110, 120 correspond to the use of the control methodologies described above with reference to FIG. 2. A wind-constrained power curve 402 is also shown in FIG. 7 that corresponds to the maximum power output that may be achieved by a wind turbine 202 at a given speed assuming that the wind turbine has no operational constraints. In other words, the wind-constrained power curve 402 indicates the power output that may be achieved if the rotor blades 214 of the wind turbine 202 are maintained at the power position across all wind speeds and no speed or torque limits are applied to the wind turbine's operation. In addition, FIG. 7 also illustrates the load-based maximum power output (indicated by line 404) for the wind turbine 202 as determined by the loading analysis performed at 302.

As shown, a significant power output range 406 (indicated by the cross-hatching) may be defined between the maximum power output 404 and the baseline power outputs defined by the control-limited power curves 110, 120. This power output range 406 may generally represent the various power outputs at which the wind turbine 202 may be operated without damaging its components. Thus, by adjusting its operational setpoints, the power output of the wind turbine 202 may be varied between its baseline and maximum power outputs. For example, assuming that the wind turbine 202 is operating at a current wind speed (indicated by line 408) and is initially being controlled according to a peak-shaving control methodology (i.e., at point 410 along power curve 120), the operational setpoints of the wind turbine 202 may be adjusted (e.g., by pitching its rotor blades 214 towards the power position) so that the power output of the wind turbine 202 may be increased to a power output between its baseline and maximum power outputs (i.e., between points 410 and 412).

As indicated above, such an ability to vary of the power output(s) of one or more of the wind turbines 202 within a wind farm 202 may generally allow the total power output of the farm to be maximized (i.e., to be equal to the power output constraint applied to the wind farm 202). For instance, FIG. 8 illustrates an example data table for a wind farm 200 having ten wind turbines 202 (each wind turbine 202 having a 1.5 MW rated power at a rated wind speed of 13 m/s) and a power output constraint of 15 MW. As shown, many of the wind turbines 202 are experiencing wind speeds below their rated wind speed. Thus, with the use of conventional control methodologies (e.g., peak-shaving control methods), the total power output of the wind farm 200 is well below the power output constraint (e.g., 13.15 MW as compared to 15 MW). However, using the method 300 disclosed herein, the operation of one or more of the wind turbines 202 may be adjusted in a manner that increases its/their power output, thereby reducing the deficiency between the total power output and the power output constraint. For example, as shown in FIG. 8, by performing a loading analysis on the wind turbines 202, load-based maximum power outputs may be determined for each wind turbine 202. Thereafter, the operation of one, some or all of the wind turbines 202 may be adjusted to increase the power output(s) of such wind turbine(s) 202 to a point between their baseline and maximum power output(s). For instance, in the example shown in FIG. 8, a 1.85 MW differential exists between the total power output and the power output constraint. In such instance, the operational setpoints of many or all of the wind turbines 202 may be adjusted such that a 1.85 MW increase is achieved in the total power output, thereby maximizing the wind farm's efficiency.

Referring back to FIG. 5, at 308 and 308 the local wind speed at each wind turbine 202 may be monitored (e.g., using the wind speed sensors 216) and, if necessary, the operation of the wind turbine(s) 202 may be adjusted to accommodate variations in the wind speed. Specifically, when controlling the operation of the wind turbines 202, it may be desirable to ensure both that the power output of each wind turbine 202 does not exceed its maximum power output and that the total power output of the wind farm 202 does not exceed the power output constraint. Thus, the wind speed at each wind turbine 202 may be continuously monitored to detect variations in the local wind speed. The wind turbines 202 may then be controlled to ensure that the system constraints are not exceeded. For example, if the current total power output of the wind farm 200 is equal to the power output constraint, a local increase in the wind speed at one of the wind turbines 202 may cause the total power output to exceed the power output constraint. In such instance, the operation of the wind turbine 202 experiencing the local wind speed variation may be adjusted (e.g., by pitching its rotor blades 214 towards feather) in order to maintain the total power output at the power output constraint. Similarly, if a wind turbine 202 is operating at its maximum power output, a local increase in the wind speed at such wind turbine 202 may cause it to exceed its maximum power output. In such instance, the operation of the wind turbine 202 may be adjusted in order to maintain its power output at or below the maximum power output.

It should be appreciated that, although the method 300 shown in FIG. 5 is described above with reference to controlling an output-constrained wind farm, aspects of the disclosed method may also be utilized to operate a non-constrained wind farm and/or to operate individual wind turbines 202 in order to maximize the power output of such farm and/or turbine(s). In such instances, instead of having two system constraints (i.e., the maximum power output and the power output constraint), each wind turbine 202 may be controlled based solely on its maximum power output as determined by the loading analysis. Thus, the operational setpoints of each wind turbine 202 may be continuously adjusted so that the power output of such wind turbine is maintained above its baseline power output for the current wind speed without exceeding its maximum power output, thereby providing an overall increase in turbine's power production over that which would be achieved using conventional control methodologies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm having a power output constraint, the method comprising:
    operating a plurality of wind turbines within the wind farm, each wind turbine including a baseline power output and a maximum power output, the baseline power output being defined by a control-limited power curve as a function of wind speed;
    comparing a total power output for the wind farm to the power output constraint of the wind farm; and;
    controlling the operation of at least one wind turbine of the plurality of wind turbines to provide an increased power output for the at least one wind turbine when the total power output is less than the power output constraint,
    wherein the increased power output at a current wind speed of the at least one wind turbine is less than or equal to the maximum power output for the at least one wind turbine and is greater than the baseline power output associated with the at least one wind turbine at the current wind speed.

2. The method of claim 1, further comprising performing a loading analysis on each wind turbine to determine its maximum power output.

3. The method of claim 2, wherein performing a loading analysis on each wind turbine comprises analyzing component loads for each wind turbine based on at least one site-specific operating condition.

4. The method of claim 1, wherein adjusting the operation of at least one wind turbine of the plurality of wind turbines to provide an increased power output comprises adjusting the operation of the at least one wind turbine such that the total power output is equal or substantially equal to the power output constraint.

5. The method of claim 1, further comprising monitoring the current wind speed of the at least one wind turbine.

6. The method of claim 5, further comprising adjusting the operation of the at least one wind turbine with variations in the current wind speed such that the increased power output is maintained at or below the maximum power output for the at least one wind turbine and the total power output is maintained substantially equal to the power output constraint.

7. The method of claim 1, wherein the maximum power output is greater than a rated power output for each wind turbine.

8. The method of claim 1, wherein the increased power output is greater than the rated power output for the at least one wind turbine when the current wind speed is equal to a rated wind speed for the at least one wind turbine.

9. The method of claim 1, wherein the control-limited power curve corresponds to a power curve achieved using a peak-shaving control methodology.

10. A system for controlling a wind farm having a power output constraint, the system comprising:
    a plurality of wind turbines, each wind turbine including a baseline power output and a maximum power output, the baseline power output being defined by a control-limited power curve as a function of wind speed; and
    a plurality of wind sensors, each wind sensor configured to monitor a current wind speed of one of the plurality of wind turbines; and
    a controller communicatively coupled to the plurality of wind turbines and the plurality of wind sensors, the controller being configured to compare a total power output of the wind farm to the power output constraint for the wind farm, the controller being further configured to control the operation of at least one wind turbine of the plurality of wind turbines to provide an increased power output for the at least one wind turbine when the total power output is less than the power output constraint,
    wherein the increased power output at the current wind speed of the at least one wind turbine is less than or equal to the maximum power output for the at least one wind turbine and is greater than the baseline power output associated with the at least one wind turbine at the current wind speed.

11. The system of claim 10, wherein the controller is configured to control the operation of the at least one wind turbine such that the total power output is substantially equal to the power output constraint.

12. The system of claim 11, wherein the controller is further configured to adjust the operation of the at least one wind turbine based on variations in the current wind speed such that the modified power output is maintained at or below the maximum power output for the at least one wind turbine and the total power output is maintained substantially equal to the power output constraint.

13. The system of claim 10, wherein the maximum power output is greater than a rated power output for each wind turbine.

14. The system of claim 10, wherein the increased power output is greater than the rated power output for the at least one wind turbine when the current wind speed is equal to a rated wind speed for the at least one wind turbine.

15. The system of claim 10, wherein the control-limited power curve corresponds to a power curve achieved using a peak-shaving control methodology.

16. A method for controlling a wind turbine, the method comprising:

performing a loading analysis on the wind turbine to determine a maximum power output for the wind turbine, the wind turbine including a baseline power output defined by a control-limited power curve as a function of wind speed;

monitoring a current wind speed of the wind turbine; and controlling the operation of the wind turbine at the current wind speed to provide an adjusted power output that is less than or equal to the maximum power output and greater than the baseline power output associated with the current wind speed.

17. The method of claim 16, wherein performing a loading analysis on the wind turbine to determine a maximum power output for the wind turbine comprises analyzing component loads for the wind turbine based on at least one site-specific operating condition of the wind turbine.

18. The method of claim 16, further comprising adjusting the operation of the wind turbine with variations in the current wind speed in order to maintain the adjusted power output less than or equal to the maximum power output and greater than the baseline power output associated with the current wind speed.

19. The method of claim 16, wherein the maximum power output is greater than a rated power output for the wind turbine.

20. The method of claim 16, wherein the control-limited power curve corresponds to a power curve achieved using a peak-shaving control methodology.

\* \* \* \* \*